(12) United States Patent
Kim et al.

(10) Patent No.: US 9,619,733 B2
(45) Date of Patent: Apr. 11, 2017

(54) METHOD FOR GENERATING A HIERARCHICAL STRUCTURED PATTERN BASED DESCRIPTOR AND METHOD AND DEVICE FOR RECOGNIZING OBJECT USING THE SAME

(71) Applicant: POSTECH ACADEMY—INDUSTRY FOUNDATION, Pohang-si, Gyeongsangbuk-do (KR)

(72) Inventors: In Su Kim, Gwangmyeong-si (KR); Dai Jin Kim, Pohang-si (KR)

(73) Assignee: POSTECH ACADEMY—INDUSTRY FOUNDATION, Pohang-si, Gyeongsangbuk-do (KR)

( * ) Notice: Subject to any disclaimer, the term of this patent is extended or adjusted under 35 U.S.C. 154(b) by 101 days.

(21) Appl. No.: 14/666,720

(22) Filed: Mar. 24, 2015

(65) Prior Publication Data

US 2015/0279048 A1  Oct. 1, 2015

(30) Foreign Application Priority Data

Mar. 26, 2014 (KR) ........................ 10-2014-0035235

(51) Int. Cl.
*G06K 9/00* (2006.01)
*G06K 9/62* (2006.01)
*G06K 9/46* (2006.01)

(52) U.S. Cl.
CPC ........... *G06K 9/6261* (2013.01); *G06K 9/469* (2013.01); *G06K 9/6282* (2013.01)

(58) Field of Classification Search
None
See application file for complete search history.

(56) References Cited

U.S. PATENT DOCUMENTS

| 9,036,925 B2* | 5/2015 | Vaddadi | G06F 17/30247 382/225 |
| 2004/0076329 A1* | 4/2004 | Skarbek | G06K 9/6232 382/224 |

(Continued)

FOREIGN PATENT DOCUMENTS

| KR | 1020120089504 A | 8/2012 |
| KR | 20120102738 A | 9/2012 |

(Continued)

OTHER PUBLICATIONS

Hanhoon Park et al.; "RFast Matching of Binary Feature Descriptors Through Sequential and Partial Comparison", Journal of the Institute of Electronics Engineers Conference, vol. 2013 No. 4, pp. 157-158.

(Continued)

*Primary Examiner* — Hadi Akhavannik
(74) *Attorney, Agent, or Firm* — Ladas & Parry LLP

(57) ABSTRACT

Disclosed are a method of generating a hierarchical structured pattern based descriptor and a method and a device for recognizing an object in an image using the same. The method of generating a hierarchical structured pattern based descriptor may include generating a hierarchical structured pattern by defining a parent node based on a patch region for a feature point of an input image to be analyzed and defining a child node obtained by dividing the parent node to a predetermined depth, calculating a master direction vector of the patch region based on position coordinates and representative pixel values of the parent node and the child node, and calculating a rotation angle of the patch region based on the master direction vector and rotating the hierarchical structured pattern by the rotation angle.

18 Claims, 12 Drawing Sheets

(56) References Cited

U.S. PATENT DOCUMENTS

| | | | | |
|---|---|---|---|---|
| 2007/0179918 A1* | 8/2007 | Heisele | ............... | G06K 9/6219 |
| | | | | 706/13 |
| 2008/0077875 A1* | 3/2008 | Li | ........................ | G06T 11/206 |
| | | | | 715/764 |
| 2010/0092093 A1* | 4/2010 | Akatsuka | ............. | G06K 9/6211 |
| | | | | 382/203 |
| 2011/0286628 A1* | 11/2011 | Goncalves | ........ | G06F 17/30256 |
| | | | | 382/103 |

FOREIGN PATENT DOCUMENTS

| | | |
|---|---|---|
| KR | 1020130078913 A | 7/2013 |
| KR | 1020130098769 A | 9/2013 |

OTHER PUBLICATIONS

Alexandre Alahi, et al; "FREAK: Fast Retina Keypoint", Published in: Computer Vision and Pattern Recognition (CVPR), 2012 IEEE Conference on; Date of Conference: Jun. 16-21, 2012; pp. 510-517.

\* cited by examiner

FIG. 5
Scale space
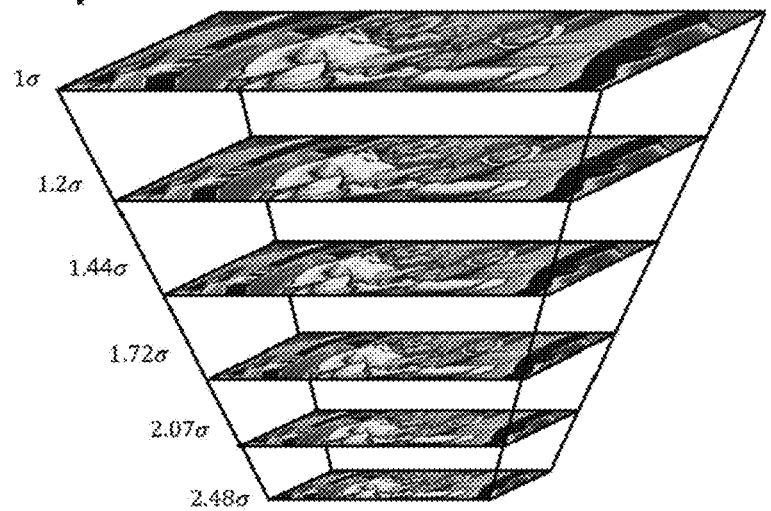
(a) Keypoint detection
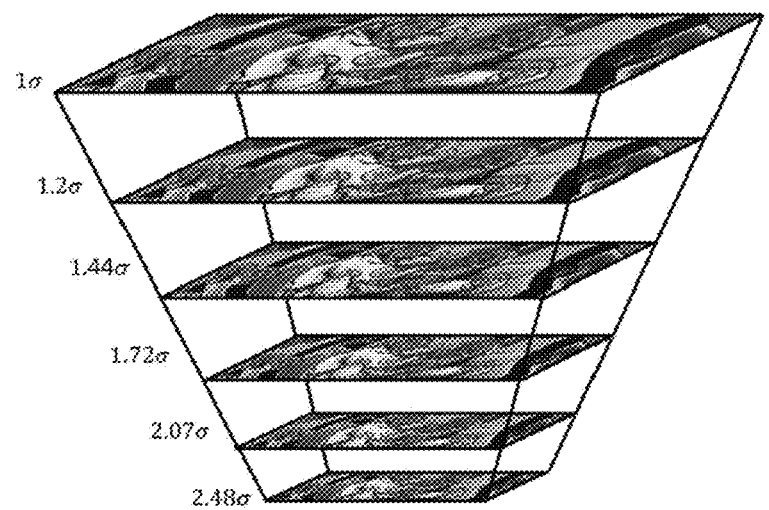
(b) Description FIG. 10
(a) Matching result
(b) Ransac result
(c) Find homography

METHOD FOR GENERATING A HIERARCHICAL STRUCTURED PATTERN BASED DESCRIPTOR AND METHOD AND DEVICE FOR RECOGNIZING OBJECT USING THE SAME

CLAIM FOR PRIORITY

This application claims priority to Korean Patent Application No. 10-2014-0035235 filed on Mar. 26, 2014 in the Korean Intellectual Property Office (KIPO), the entire contents of which are hereby incorporated by reference.

BACKGROUND

1. Technical Field

Example embodiments of the present invention relate in general to an object recognition technology in computer vision, and more specifically, to a method and device for recognizing an object from an input image using a designed descriptor based on a hierarchical structured pattern.

Example embodiments of the present invention also relate in general to a technique for analyzing a feature point of an input image for the recognition, and more specifically, to a technique in which a patch region for a feature point is hierarchically divided to generate a descriptor.

2. Related Art

Computer vision is a recently emerging field of research in computer science in which parts corresponding to vision in machines are studied. In a wider category, computer vision is one branch of artificial intelligence (AI) and focuses on using computers to realize general human visual recognition abilities.

Examples of a technical application that needs the computer vision include digital image processing, machine learning, pattern recognition, and object recognition. The object recognition refers to a technique for watching an image of an object and then discovering space information such as the type, size, direction, and position of the object in real time based on knowledge information that is previously learned. This is a challenge of the entire computer science field in addition to a robot field.

Technical needs on a technique for generating a feature point and a technique for generating a descriptor, each of which is an object representation scheme for object recognition in the computer vision field, increase in many applications such as object recognition, object retrieval, an intelligent monitoring system, an intelligent robot, virtual reality, and so on. Furthermore, the demand on a descriptor having of a low memory capacity and a high recognition performance has significantly increased with the increase in the mobile market. In order to represent such a high-efficiency object, a descriptor should have a recognition performance that is robust to various changes such as hiding, lighting, and rotation of an object and may also be processed in real time.

In the existing research, a scale-invariant feature transform (SIFT) and a seeded up robust features (SURF) are proposed and utilized as an algorithm for recognizing and representing an object. However, since its operation is complicated, it is difficult to perform processing in real time. Recently, after binary robust independent elementary features (BRIEF), a binary descriptor such as the Oriented FAST and Rotated BRIEF (ORB), Binary Robust Invariant Scalable Key points (BRISK), and Fast Retina Key point (FREAK) has been proposed, which shows significant enhancement in terms of an object recognition performance and speed of a descriptor. However, the ORB and BRISK have typical limitations in representing an object due to selection of a feature with learning or at random, and the FREAK enables high speed processing, but its recognition performance has not been demonstrated clearly.

SUMMARY

Accordingly, example embodiments of the present invention are provided to substantially obviate one or more problems due to limitations and disadvantages of the related art.

Example embodiments of the present invention provide a method and device for estimating a pose and a pose of a target object in a camera input image, in which the target object denotes a region for an identifiable target including semantic information such as a specific object, face, and person in an image.

Example embodiments of the present invention also provide a method of generating a descriptor that is described in a scheme proposed by generating a pyramid image and generating a feature point such as a corner, estimating a master direction in a patch region centered on the feature point, rotation-normalizing a hierarchical structured pattern, and using the hierarchical structured pattern rotation-normalized around the feature point.

Example embodiments of the present invention also provide a method of performing cascade descriptor matching between the above-described hierarchical structured pattern based descriptor and a previously stored target object descriptor and estimating a geometrical transformation relation (homography) between objects based on two-dimensional positions of matched descriptors.

In some example embodiments, a method of generating a descriptor to recognize an object from an image, the method includes generating a hierarchical structured pattern by defining a parent node based on a patch region for a feature point of an input image to be analyzed and defining a child node by dividing the parent node to a predetermined depth, calculating a master direction vector of the patch region based on representative pixel values and position coordinates of the parent node and the child node, and calculating a rotation angle of the patch region based on the master direction vector and rotating the hierarchical structured pattern by the rotation angle.

The method may further include, before the generating of the hierarchical structured pattern, setting the patch region for the feature point using at least one of a FAST edge extraction technique and a Harris corner detection technique.

The method may further include, after the rotating of the hierarchical structured pattern by the rotation angle, describing a descriptor based on the rotated hierarchical structured pattern, the representative pixel value of the parent node, and the representative pixel value of the child node.

The hierarchical structured pattern may be generated in a recursive method in which a first child node is defined by dividing a top parent node by the predetermined number N of nodes and a child node is defined for each depth using the first child node as a second top parent node, N being a natural number and the division having redundancy or an exception. The recursive method may include a first division method of equally dividing the top patent node using a radius of the top parent node as a diameter to generate N first child nodes, a second division method of additionally generating one first child node forming a circle concentric with the top parent node after performing the first division method a number of times equal to the predetermined number N of nodes minus 1, or a third division method of equally dividing the top patent node using a length greater than the radius of the top parent node as the diameter to generate the N first child nodes.

The predetermined number of nodes and the predetermined depth may be increased or decreased based on the feature point.

The representative pixel value may be an average of pixel values of regions corresponding to the parent node or the child node or a pixel value weighted by performing Gaussian convolution on the region.

The method may further include, before the generating of the hierarchical structured pattern, multiplying the image by real numbers to generate a pyramid image space including a plurality of images with different sizes and outputting one of the images within the pyramid image space as the image to be analyzed.

In other example embodiments, a method for recognizing an object in an image using a hierarchical structured pattern based descriptor, the method includes separating a descriptor into groups having a predetermined number D, calculating a distance between an i-th group of the descriptor and a pre-stored i-th group of a reference descriptor, calculating a distance between an (i+1)th group of the descriptor and a pre-stored (i+1)th group of the reference descriptor when the calculated distance is determined to be less than a certain threshold value, and matching the descriptor with the pre-stored reference descriptor when a distance between a D-th group of the descriptor and a pre-stored D-th group of the reference descriptor is determined to be less than a certain threshold value, in which i may be iterated from a first term 1 to D−1.

When the distance between the i-th group of descriptors and the pre-stored i-th group of reference descriptors is greater than or equal to the certain threshold value, the calculating of the distance between the (i+1)th groups may be omitted, and a matching between the descriptor and the pre-stored reference descriptor may be skipped.

The method may further include, after the matching of the descriptors, estimating a homography between the object and a reference object that is a target of the pre-stored reference descriptor.

The method may further include, before the estimating of the homography, determining whether to recognize the object based on the homography, in which the determining of whether to recognize the object may include at least one of a first determination method of determining whether to recognize the object based on the number of inliers calculated through a random sample consensus (RANSAC) algorithm among descriptors that are finally matched, a second determination method of determining whether to recognize the object based on accuracy of the homography, and a third determination method of normalizing the object based on the homography such that an affine-transformed region and a reference object region have the same pose and determining whether to recognize the object based on information regarding a template matching result. The term of inlier means true information.

The predetermined number D may be equal to a depth in which the patch region for the feature point that is the target of the hierarchical structured pattern based descriptor is divided into child nodes.

A device for recognizing an object from an image using a hierarchical structured pattern based descriptor, the device includes a pattern generation unit configured to generate a hierarchical structured pattern by defining a parent node based on a patch region for a feature point of an input image to be analyzed and defining a child node by dividing the parent node to a predetermined depth, a master direction calculation unit configured to calculate a master direction vector of the patch region based on position coordinates and representative pixel values of the parent node and the child node, and a pattern rotation unit configured to calculate a rotation angle of the patch region based on the master direction vector and rotate the hierarchical structured pattern by the rotation angle.

The device may further include a region setting unit configured to set the patch region for the feature point using a FAST edge extraction technique and a Harris corner detection technique.

The device may further include a descriptor description unit configured to describe a descriptor based on the rotated hierarchical structured pattern, the representative pixel value of the parent node, and the representative pixel value of the child node.

The device may further include a pyramid image generation unit configured to multiply the image by real numbers to generate a pyramid image space including a plurality of images with different sizes and output one of the images within the pyramid image space as the image to be analyzed.

The device may further include a descriptor matching unit configured to separate a descriptor into groups corresponding to a predetermined depth, calculate a distance between the descriptor and a pre-stored reference descriptor for each group, and determine whether the descriptor and the pre-stored reference descriptor are matched based on a result of the calculation.

The device may further include a homography estimation unit configured to estimate a homography between the object and a reference object that is a target of the pre-stored reference descriptor.

The device may further include an object recognition unit configured to determine whether to recognize the object based on the homography, in which the object recognition unit includes at least one of a first determination by determining whether to recognize the object based on the number of inliers calculated through a random sample consensus (RANSAC) algorithm among descriptors the are finally matched, a second determination by determining whether to recognize the object based on accuracy of the homography, and a third determination by normalizing the object based on the homography such that an affine-transformed region and a reference object region have the same pose and determining whether to recognize the object based on information regarding a template matching result.

BRIEF DESCRIPTION OF DRAWINGS

Example embodiments of the present invention will become more apparent by describing in detail example embodiments of the present invention with reference to the accompanying drawings, in which:

FIG. 5 is an exemplary view showing a process of generating a pyramid image space according to an embodiment of the present invention;

FIG. 10 is an exemplary view showing a result of performing object recognition through a descriptor matching process according to an embodiment of the present invention;

DESCRIPTION OF EXAMPLE EMBODIMENTS

Figure 1:
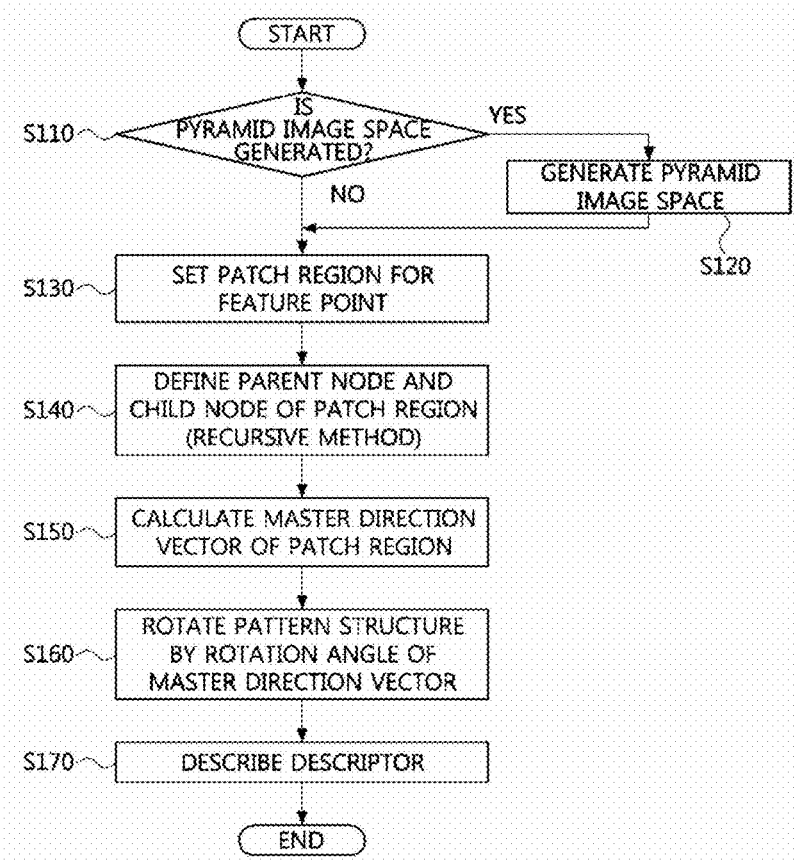
FIG. 1 is a flowchart showing a method of describing a hierarchical structured pattern based descriptor and its detailed steps according to an embodiment of the present invention.

While the invention is susceptible to various modifications and alternative forms, specific embodiments thereof are shown by way of example in the drawings and will herein be described in detail. However, it should be understood that the present invention is not limited to these embodiments, and may include any and all modification, variations, equivalents, substitutions and the like within the spirit and scope thereof. Like reference numerals refer to like elements throughout.

Relational terms such as first, second, and the like may be used for describing various elements, but the elements should not be limited by the terms. These terms are only used to distinguish one element from another. For example, a first component may be called a second component, and a second component may also be called a first component without departing from the scope of the present invention. The term 'and/or' means any one or a combination of a plurality of related and described items.

When it is mentioned that a certain component is "coupled with" or "connected with" another component, it should be understood that the certain component is directly "coupled with" or "connected with" to the other component or a further component may be located therebetween. In contrast, when it is mentioned that a certain component is "directly coupled with" or "directly connected with" another component, it will be understood that a further component is not located therebetween.

The terms used in the present specification are set forth to explain the embodiments of the present invention, and the scope of the present invention is not limited thereto. The singular number includes the plural number as long as they are not apparently different from each other in meaning. In the present specification, it will be understood that the terms "have," "comprise," "include," and the like are used to specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. Terms such as terms that are generally used and have been in dictionaries should be construed as having meanings matched with contextual meanings in the art. In this description, unless defined clearly, terms are not ideally, excessively construed as formal meanings.

First, terms used herein may be simply described as follows.

The term "descriptor" is used to set a feature of a programs unit in a computer or define a feature of a record for each block of a file. This descriptor is a short word that appropriately indicates the content of information. The descriptor is used as a key word for finding an objective record and an objective program in a file and utilized to inspect a system in which the use of vocabulary is limited. In information retrieval, desired information may be retrieved and scanned using, as a key word, a name and a type that are used to classify and index information in a database.

A feature point is a point that is detected in an image to distinguish between objects. In order for a computer to reply to a question such as which picture is applied as an input or what is an object in a picture, first, such feature points should be detected and then an object indicated by the feature points may be output as a final result through a matching process.

A patch region is a certain region including pixels that are around a feature point and may represent a feature of the feature point. A patch region is named because its shape is similar to a patch that is attached to a certain wounded region or a leather piece that is used to patch up his/her clothes.

A node is generally an element constituting a graph along with an edge, and graphtheoretically is also referred to as a joint, a peak, or a point. That is, the graph is composed of points and lines. Each of the points is called a node or joint. However, in the present disclosure, a node is used in that the node represents a feature point in an image, but the node actually refers to a part with a certain region including a pixel.

A depth in the present disclosure refers to the number of layers into which a certain region in an image is hierarchically divided. For example, the depth of 4 refers that the number of layers into which the certain region is divided is 4. If layer 0 is an initial non-divided region, layer 1, layer 2, and layer 3 denote regions into which the initial non-divided region is gradually and minutely divided.

Redundancy denotes that there is an overlap, which is a part in which the divided nodes overlap each other. That is, the redundancy may be considered as the antonym of mutually exclusive (ME). An exception denotes a difference set in mathematics. However, the exception in the present disclosure means that there is the remaining region obtained by subtracting the sum of the divided nodes from the patch region. That is, the exception may be considered as the antonym of collectively exhaustive (CE).

A homography denotes in an isomorphism of projective spaces, induced by an isomorphism of the vector spaces in projective geometry. That is, it is a bijection that maps lines to lines.

A random sample consensus (RANSAC) algorithm is a regression analysis method that may avoid a noise problem caused by significantly deviating from a normal distribution, which is a weak point of the least square method in regression analysis. An erroneous point that significantly deviates from a normal distribution is called an outlier. If an outlier is contained in data, a picture obtained by applying a least squares method is in a mess. A least squares method finds a model that minimizes the sum of the squares of the residuals for a given set of data while an RANSAC selects a model in which the consensus is maximum, that is, a model that is supported by a largest number of pieces of data. In the above description, a largest number of pieces of data correspond to inliers.

An affine transformation is a transformation that makes one vector space correspond to another vector space, which is a composition of a linear transformation and a parallel translation transformation.

Preferred embodiments of the present invention will be described below in more detail with reference to the accompanying drawings.

Figure 2:
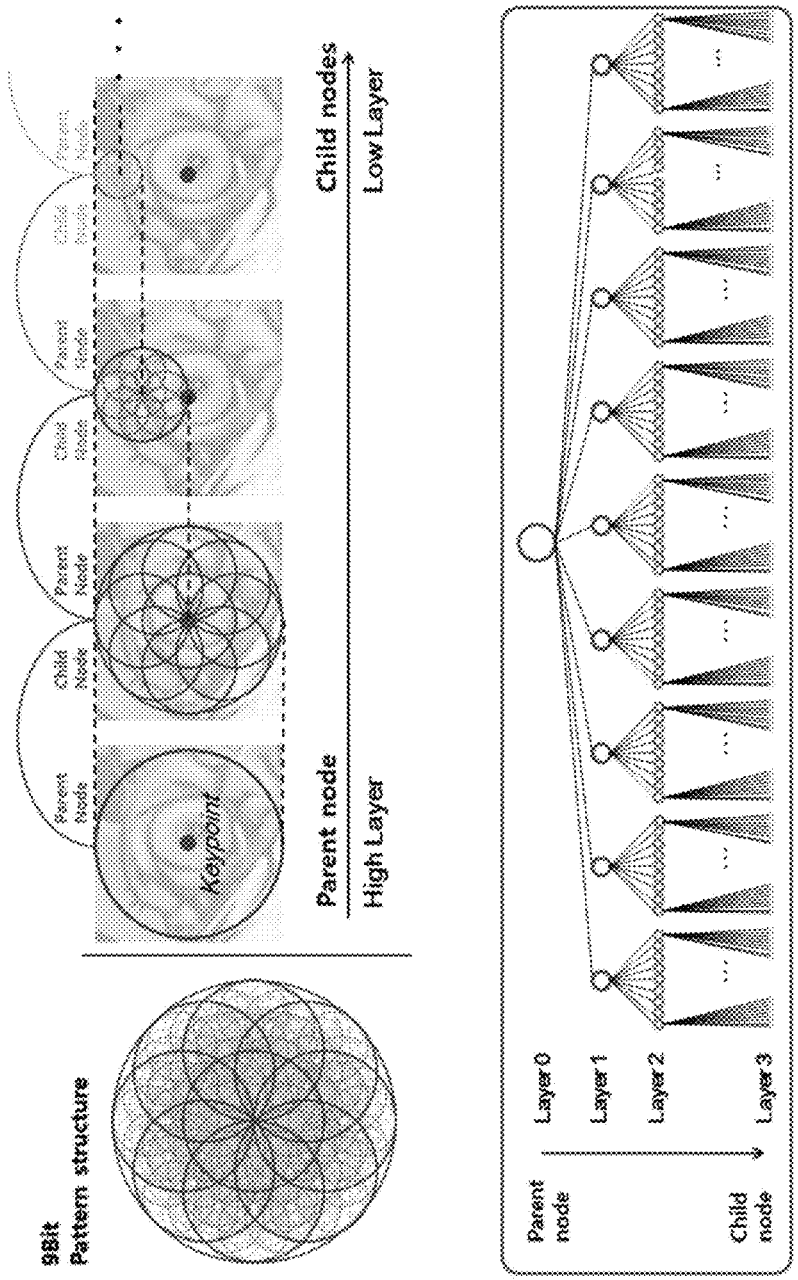
FIG. 2 is a conceptual view showing a hierarchical structured pattern for describing a descriptor according to an embodiment of the present invention.
Figure 3:
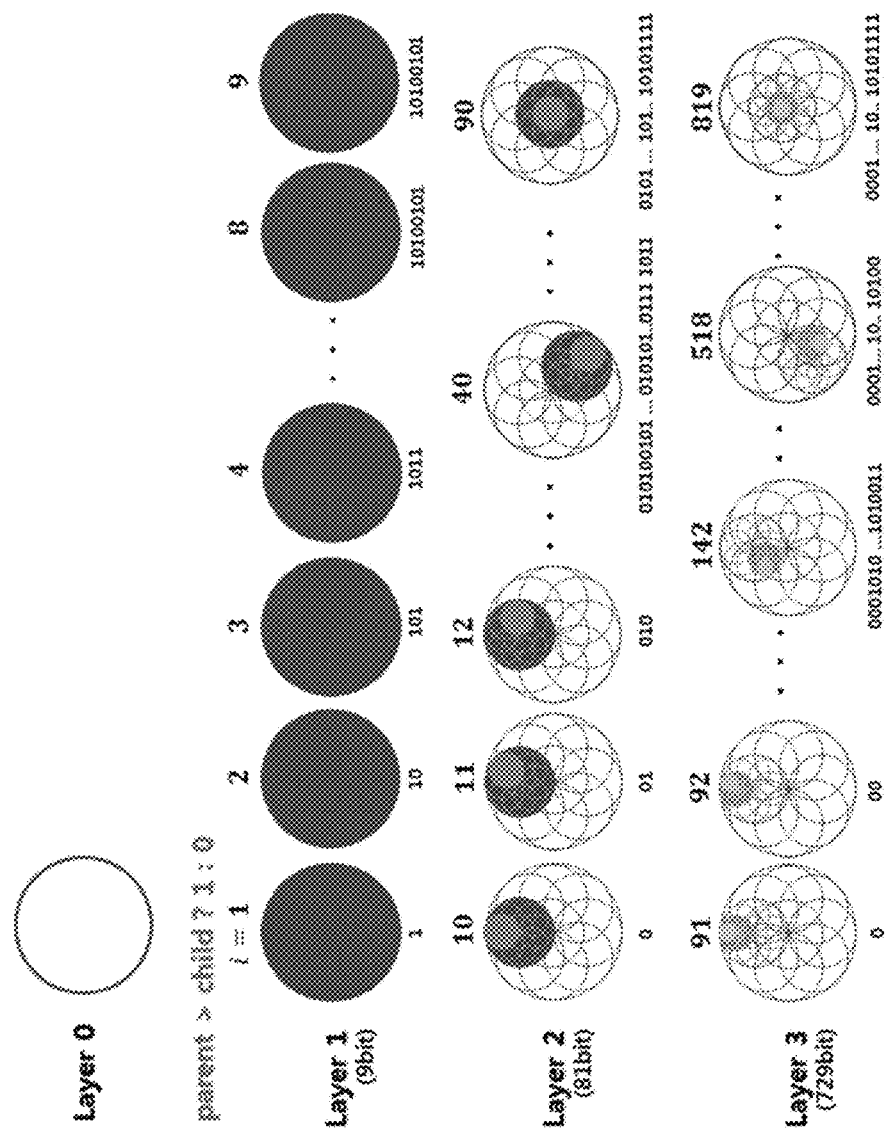
FIG. 3 is an exemplary view showing a process of extracting a binary descriptor in a hierarchical structured pattern when the number of nodes is nine according to an embodiment of the present invention.
Figure 4:
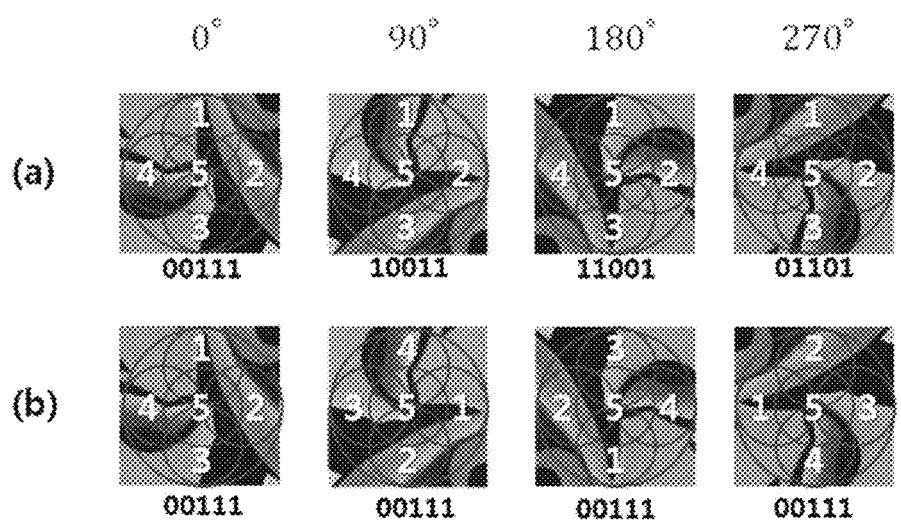
FIG. 4 is an exemplary view showing a result of extracting a descriptor having a pattern structure including five child nodes with a depth of 1 according to an embodiment of the present invention.
Figure 6:
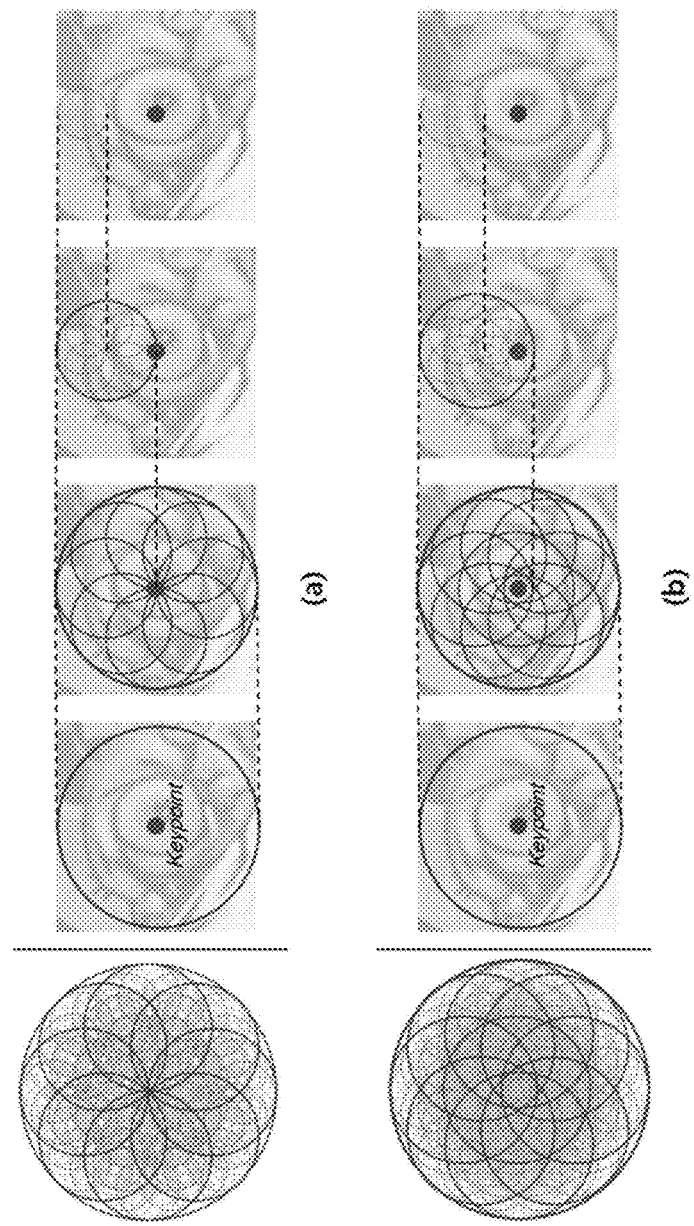
FIG. 6 is an exemplary diagram showing various shapes of a hierarchical structured pattern according to an embodiment of the present invention.

FIG. 1 is a flowchart showing a method of describing a hierarchical structured pattern based descriptor and its detailed steps according to an embodiment of the present invention. FIG. 2 is a conceptual view showing a hierarchical structured pattern for describing a descriptor. FIG. 3 is an exemplary view showing a process of extracting a binary descriptor in a hierarchical structured pattern when the number of nodes is nine. FIG. 4 is an exemplary view showing a result of extracting a descriptor having a pattern structure including five child nodes with a depth of 1. FIG. 5 is an exemplary view showing a process of generating a pyramid image space according to an embodiment of the present invention. FIG. 6 is an exemplary diagram showing various shapes of a hierarchical structured pattern according to an embodiment of the present invention. A method of generating a hierarchical structured pattern based descriptor will be described with reference to FIGS. 1 to 6.

A method of generating "a hierarchical structured pattern based descriptor", which is a method of describing a descriptor to recognize an object from an image, generating a hierarchical structured pattern by defining a parent node based on a patch region for a feature point of an input image to be analyzed and defining a child node by dividing the parent node to a predetermined depth (S140), calculating a master direction vector of the patch region based on representative pixel values and position coordinates of the parent node and the child node (S150), and calculating a rotation angle of the patch region based on the master direction vector and rotating the hierarchical structured pattern by the rotation angle (S160).

The method of describing a hierarchical structured pattern based descriptor may further include setting the patch region for the feature point using at least one of a FAST edge extraction technique and a Harris corner detection technique (S130) before the generating of the hierarchical structured pattern.

The method of describing a hierarchical structured pattern based descriptor may further include describing a descriptor based on the rotated hierarchical structured pattern, the representative pixel value of the parent node, and the representative pixel value of the child node (S170) after the rotating (S160).

The hierarchical structured pattern is generated in a recursive method in which a first child node is defined by dividing a top parent node by the predetermined number N of nodes and a child node is defined for each depth using the first child node as a second top parent node. Here, the predetermined number N of nodes may be a natural number, and the division may include redundancy or an exception. Furthermore, the recursive method may include a first division method of equally dividing the top patent node using a radius of the top parent node as a diameter to generate N first child nodes, a second division method of additionally generating one first child node forming a circle concentric with the top parent node after performing the first division method a number of times equal to the predetermined number N of nodes minus 1, or a third division method of equally dividing the top patent node using a length greater than the radius of the top parent node as the diameter to generate N first child nodes. Moreover, the predetermined number and depth of nodes may increase or decrease based on a feature point.

The representative pixel value may be an average between respective pixel values of regions corresponding to the parent node and the child node or may be a weighted pixel value obtained by performing Gaussian convolution on each region.

The method of describing a hierarchical structured pattern based descriptor may further include multiplying the image by real numbers to generate a pyramid image space including a plurality of images with different sizes and outputting one of the images within the pyramid image space as the image to be analyzed (S110 and S120) before the generating of the hierarchical structured pattern (S140).

A binary descriptor denotes a set of binary codes having semantic information representing 0 or 1 in one bit region of a computer code and may allow the descriptor matching at very high speed, be generated using a simple operation such as comparison of intensity values of any two positions, and require a low-capacity memory. The present invention proposes a new method of describing a new-hierarchical structured pattern based descriptor, and discloses a method and device for recognizing an object using the new method. A target to which the present invention is applied is defined as a patch region for a feature point obtained from an object using an existing feature point extraction method such as the FAST edge extractor and the Harris corner detector, and the present invention may be applied to an object region having semantic information such as a face.

An example of a hierarchical structured pattern that is proposed to describe a binary descriptor in a feature point region is as shown in FIG. 2. The pattern structure as shown in FIG. 2 may include recursive inheritance relations between the parent node and the child node. Nodes in the same layer may be formed as a circle with the same size, and the nodes may be defined as one layer. The number of child nodes belonging to the parent node may be increased or decreased depending on required performances, and the depth of layer may also be increased or decreased. For example, the size of the child node may have a diameter equal to a diameter of the parent node and may have the shape of a concentric circle at a position in which 360 degrees are divided by the number of nodes. As the number of nodes increases or the depth of layer decreases, a more precise descriptor may be generated, which also increases a required processing speed and memory size.

FIG. 2 shows that there are totally 820 nodes when a pattern structure having one parent node and nine child nodes has a layer depth of 4, and the parent node and child nodes have a hierarchical relation. For example, each node may be represented as a circle, the child node may have a diameter equal to a radius of the parent node, and a representative pixel value representing a node may be represented as an average of pixels values in a region at a position of the node or as a weighted pixel value obtained by convolution of a Gaussian function having a certain variance according to the node size.

The dimension of the descriptor disclosed in FIG. 2 is 819. That is, since the top node does not have a parent node, the total number of child nodes, which is the total number of nodes minus the number of top parent node being 1, becomes the dimension of the descriptor. Equation 1 below shows an equation for finding the dimension of the descriptor according to the number of child nodes belonging to one parent node.

$$D = \sum_{d=1}^{L} C^d \quad [\text{Equation 1}]$$

L: Depth of layer
C: Number of child nodes belonging to one parent node
D: Dimension of descriptor FIG. 2 shows that the number of child nodes is 9. Equation 1 shows that as the depth of layer increases, the dimension of the descriptor exponentially increases.

A method of extracting a binary descriptor from a pattern structure with a parent node having 9 child nodes is the same as shown in FIG. 3. 9 bit codes in a top layer may be determined by sequentially comparing a representative pixel value of one parent node in layer 0 and representative pixel values of child nodes in layer 1, and a bit code may be described through comparison between a representative pixel value of one parent node in layer 1 and representative pixel values of child nodes in layer 2. Subsequently, the lower layer may describe a bit code in the same manner according to the depth. In FIG. 3, a parent node and child nodes in layer 1, which is a top level, are represented as a purple solid outline and a red solid outline, respectively, a parent node and child nodes in layer 2 are represented as a red solid outline and a sky blue solid outline, respectively, and a parent node and child nodes in layer 3 are represented as a sky blue solid outline and a yellow solid outline, respectively. The descriptor may be described through comparison between the representative pixel value of the parent node and the representative pixel values of the child nodes in the next layer included in the parent node. Equation 2 below shows a proposed process of describing a descriptor.

$$F = \sum_{i=1}^{D} 2^i T(x_i) \quad [\text{Equation 2}]$$

$$T(x_i) = \begin{cases} 1 & \text{if } I(P(x_i)) - I(x_i) > 0 \\ 0 & \text{otherwise} \end{cases}$$

D: Dimension of descriptor,
$x_i$: Central position of i-th node that determines code of i-th bit of descriptor,
$P(x_i)$: Central position of parent node of i-th node,
I( ): representative pixel value of node,
$T(x_i)$: comparison of representative values of i-th parent node and child node.

A descriptor generating method according to an embodiment of the present invention has a different descriptor for an object region when the object region is rotated, since a description order is determined for each bit. That is, the method has no constancy with respect to the rotation of the object region. The rotation invariability may be represented as shown in FIG. 4. FIG. 4 shows a pattern structure including 5 child nodes with a depth of 1. Here, a white number indicates an order in which nodes are described, and a set of codes under each picture shows a result of the description. An (a) of FIG. 4 shows a fixed hierarchical pattern, that is, different description results for rotated images of the same object, and an (b) of FIG. 4 shows a result of generating a descriptor when the pattern is rotated at 90 degree intervals, that is, the same description result for rotated images of the same object. FIG. 4 shows that a descriptor that is invariable with respect to rotation of an object may be generated when the rotation is performed in a specific direction that is invariable to the rotation. Accordingly, in order to estimate the rotation invariable descriptor, it is necessary to estimate a master direction in a feature point patch region and rotation-normalize the hierarchical pattern. Equation 3 shows that the master direction is estimated using a hierarchical structured pattern in the present invention.

$$\vec{O} = \frac{1}{D}\sum_{i=1}^{D}(I(P(x_i)) - I(x_i)) \cdot \frac{P(x_i) - x_i}{\|P(x_i) - x_i\|} \quad [\text{Equation 3}]$$

O: Direction vector from center of feature point to master direction,
D: Dimension of descriptor, that is, total number of child nodes.

In Equation 4 below, a rotation angle to the master direction may be estimated from the direction vector estimated in Equation 3, and the rotation invariable descriptor may be generated by rotating a pattern using the estimated rotation angle and describing a descriptor.

$$\theta = \tan^{-1}\frac{O_y}{O_x} \quad [\text{Equation 4}]$$

θ: Rotation angle to master direction.

In the present invention, in order to generate a scale invariable descriptor, a pyramid image, which is a scale space, may be generated as shown in FIG. 5, and a descriptor may be described for each scale level. The pyramid image is a method of changing the size of an input image by a specific multiple, for example 1σ, 1.26σ, 1.44σ, 1.72σ, 2.07σ and 2.48σ, to generate a scale space of an image. After generating a pyramid image, a keypoint may be detected or a feature point may be estimated for an image of each scale level, and a descriptor may be described at each position, thereby performing recognition on change in scale of an object in the pyramid space. Refer to (a) Keypoint detection and (b) Description of FIG. 5.

FIG. 6 shows various shapes of a hierarchical structured pattern proposed by the present invention. An (a) of FIG. 6 shows a pattern structure in which a central node is excluded from the above-presented pattern structure. For this pattern structure, since an 8-bit representation is allowed, a character type is represented with an 8-bit memory in a computing environment to save a memory, and an optimization technique may be easily used in a matching process. In addition, description of the descriptor and implementation or calculation of the matching are simple. However, since there is no central node, the pattern structure has a lower recognition rate than the 9-bit layer descriptor of FIG. 2. An (b) of FIG. 6 shows a pattern structure in which a size of a child node is greater than a radius of a parent node. Here, a pattern may be represented densely at the center of the feature point. This means that information at the center of the patch is used more to describe a descriptor, which shows that a region closer to the center may affect the generation of the signal more. This pattern may have a higher recognition rate than the 9-bit layer descriptor of FIG. 2 when information is denser at the center of the feature point region than near the edge.

Figure 7:
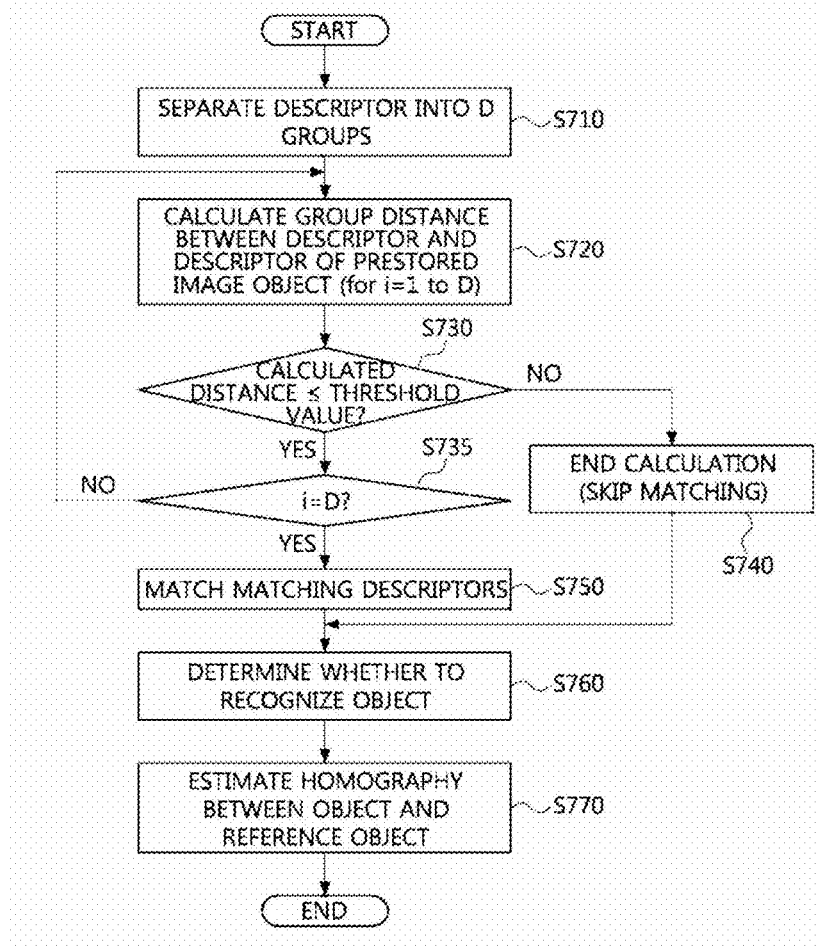
FIG. 7 is a flowchart showing a method of estimating a pose of an object in an image and its detailed steps according to an embodiment of the present invention.
Figure 8:
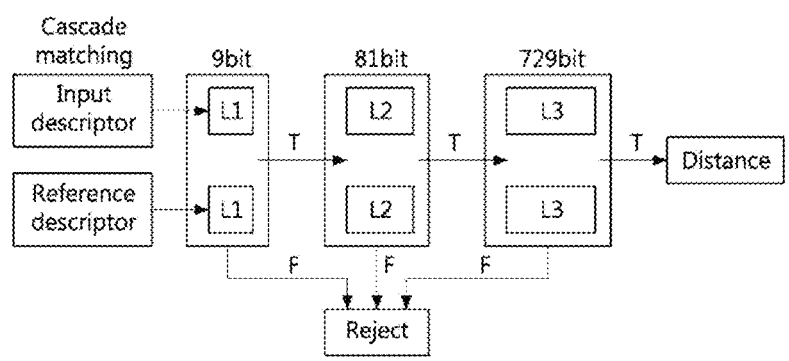
FIG. 8 is a conceptual view showing a cascade descriptor matching process that uses a hierarchical structured pattern based descriptor according to an embodiment of the present invention.
Figure 9:
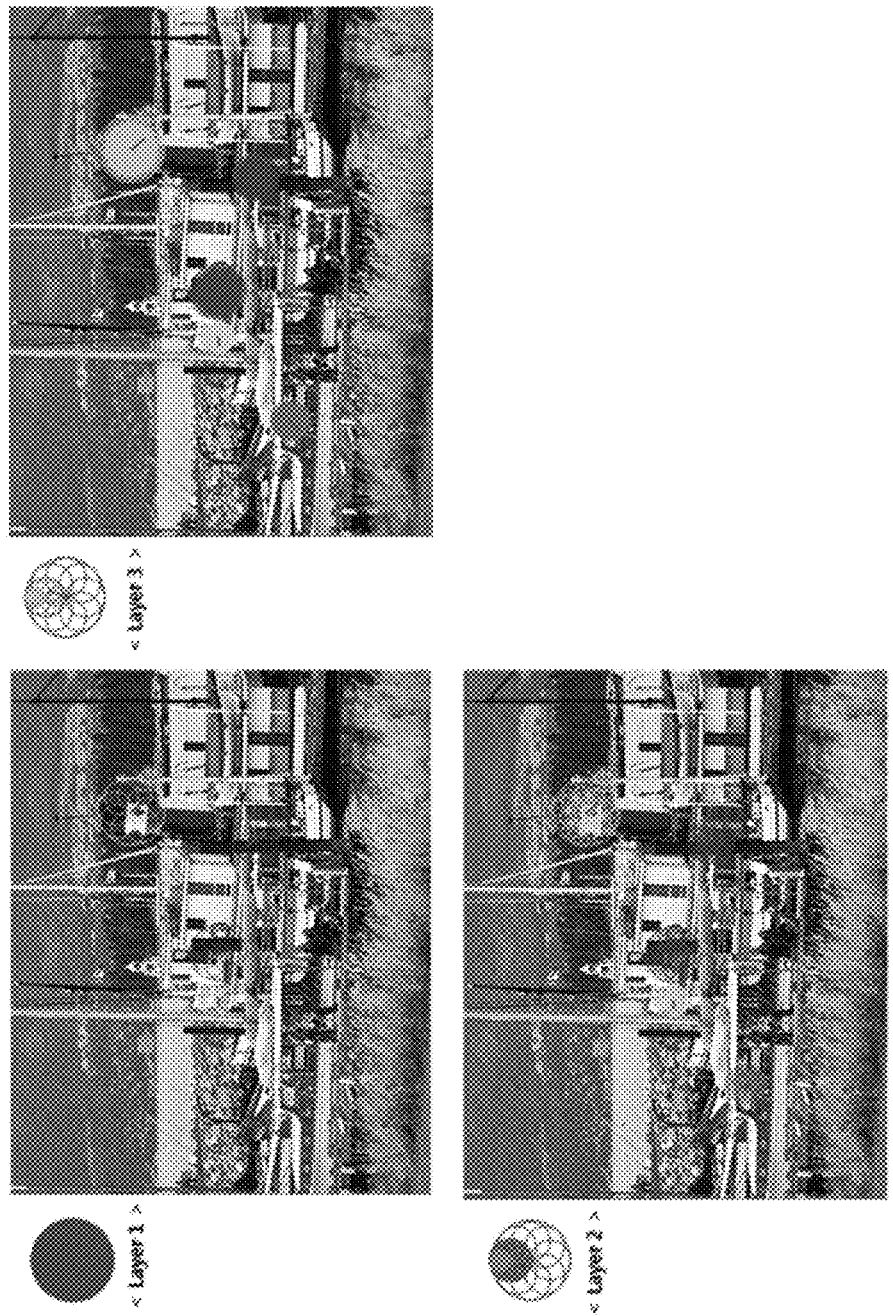
FIG. 9 is an exemplary view showing hierarchical structured patterns of five corner feature points according to an embodiment of the present invention.

FIG. 7 is a flowchart showing a method of estimating a pose of an object in an image and its detailed steps according to an embodiment of the present invention. FIG. 8 is a conceptual view showing a cascade descriptor matching process using a hierarchical structured pattern based descriptor. FIG. 9 is an exemplary view showing hierarchical structured patterns of five corner feature points. FIG. 10 is an exemplary view showing a result of performing object recognition through a descriptor matching process. A method of estimating a pose of an object in an image will be described with reference to FIGS. 7 to 10.

The method of estimating a pose of an object in an image, which is a method of estimating a pose of an object in an image using a hierarchical structured pattern based descriptor, includes separating the descriptor into groups having a predetermined number D of descriptors (S710), calculating a distance between an i-th group of descriptors and a pre-stored i-th group of reference descriptors (S720), calculating a distance between an (i+1)th group of descriptors and a pre-stored (i+1)th group of reference descriptors (S720) when the calculated distance is determined to be less than a certain threshold value (S730), and matching the descriptor with the pre-stored reference descriptor when a distance between a D-th group of descriptors and a pre-stored D-th group of reference descriptors is determined to be less than a certain threshold (S750), in which i is iterated from a first term 1 to D−1 (S735).

When the distance between the ith group of descriptors and the pre-stored i-th group of reference descriptors is greater than or equal to the certain threshold value, the calculating of the distance between (i+1)th groups may be omitted, and a matching between the descriptor and the pre-stored reference descriptor may be skipped (S740).

The method of estimating a pose of an object in an image may further include estimating a homography between the object and a reference object that is a target of the pre-stored reference descriptor (S770) after the matching of the descriptors (S750). Furthermore, the method of estimating a pose of an object in an image may further include determining whether to recognize the object based on the homography (S760) before the estimating of the homography (S770). The determining of whether to recognize the object may be at least one of a first determination method of determining whether to recognize the object based on the number of inliers calculated through a random sample consensus (RANSAC) algorithm among descriptors the are finally matched, a second determination method of determining whether to recognize the object based on an accuracy of the homography, and a third determination method of normalizing the object based on the homography such that an affine-transformed region and a reference object region have the same pose and determining whether to recognize the object based on information regarding a template matching result.

The predetermined number D may be equal to a depth in which the patch region for the feature point that is the target of the hierarchical structured pattern based descriptor is divided into child nodes.

The hierarchical structured pattern based descriptors that are described from feature points in an input image may perform a matching process through comparison between distances of the hierarchical structured pattern based descriptors that are extracted from a previously registered database image. The term "matching" used herein may define that two pairs of descriptors having the closest distance match each other. The descriptor proposed in the present invention may measure a distance using a Hamming distance as a set of binary codes. The Hamming distance in a binary descriptor domain may be easily calculated through a computer bit-wise XOR operation. Accordingly, the descriptor matching may be performed at higher speed than that of the existing descriptors that are represented with decimal points.

The distance measurement method for matching in the present invention proposes, in addition to using the Hamming distance, a method of matching descriptors at high speed in a cascade matching method that uses the hierarchical structure, compared to the existing methods. FIG. 8 shows a cascade descriptor matching process using a hierarchical structured pattern based descriptor that is proposed in the present invention. Here, the cascade matching means a technique of grouping bits, for example L1, L2 and L3, of an input descriptor and a reference descriptor for each step and consecutively performing matching to a next step when matching is made in a previous step.

The present invention may perform high-speed matching by defining respective layers in a pre-defined hierarchical structure as steps in the cascade and perform cascade matching for 9 bit, 81 bit and 729 bit. When a result of measuring a distance only using first 9 bits, second 81 bits or third 729 bits that indicate entire characteristics of a patch region centered on the feature point is that the input descriptor and the reference descriptor are different from each other (rejection), there is no need for further distance measurement and thus a subsequent comparison operation between bits may be omitted to significantly reduce the overall amount of operations. When the measurement result is not rejected, detailed matching by a subsequent bit operation is performed.

This corresponds to characteristics of a hierarchical structure in which an upper layer indicates a coarse characteristic of the patch using a small amount of information and a lower layer indicates a fine characteristic including a large amount of information. FIG. 9 shows structures in layers of any five corner feature points that are extracted from an image. Layer 1 includes a small number of large nodes. As the depth of layer increases, a larger number of nodes are included. Layer 3 may densely and finely represent a patch region centered on a feature point than Layer 1 and Layer 2.

A method of taking a threshold value for each step and performing rejection based on the threshold value may be used to reject the matching for each step. The descriptors that are finally matched may determine a transformed pose and whether to be recognized, by estimating a homography that is a relation between objects through an RANSAC algorithm. Here, the recognition may be determined by determining the number of inliers or accuracy of the homography. Alternatively, template matching is performed by performing normalization such that a region that is obtained by performing affine transformation on the estimated pose and a pre-stored object image have the same pose, and the recognition may be determined when a degree of matching is greater than a certain threshold value.

FIG. 10 illustrates a result of performing object recognition using a descriptor matching process proposed by the present invention. A left image is any database image, and a right image is an image that is obtained by rotating the database image using an affine transformation. An (a) of FIG. 10 shows a result of extracting about 500 or more feature points from two images and then performing the above-described cascade matching thereon. A pair of descriptors that are positioned closest to each other may be represented as a line. An (b) of FIG. 10 represents only inliners as lines by applying an RANSAC algorithm to 500 or more matching descriptor pairs to remove outliners. An (c) of FIG. 10 may show a result of estimating a homography between two images from an inliner pair and estimating an affined pose in a right image using a left image as an object, in which a pose of affine transformed object is output as a green quadrangle.

Figure 11:
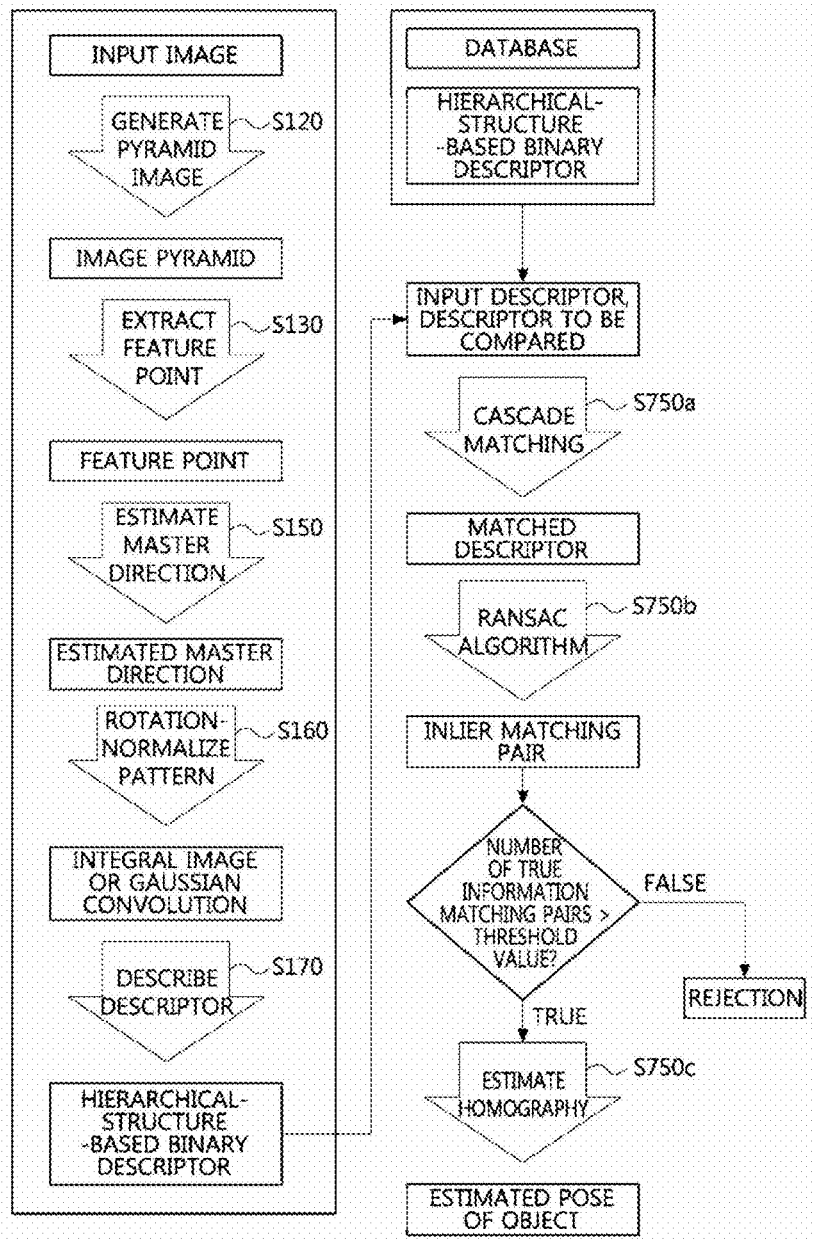
FIG. 11 is a simple flowchart showing a method of describing a hierarchical structured pattern based descriptor and a method of estimating a pose of an object in an image according to an embodiment of the present invention.

FIG. 11 is a simple flowchart showing a method of describing a hierarchical structured pattern based descriptor and a method of estimating a pose of an object in an image according to an embodiment of the present invention. With reference to FIG. 11, a method of describing a hierarchical structured pattern based descriptor and a method of estimating a pose of an object in an image are simplified as follows.

An object for recognition in the present invention may denote a region for an identifiable target including semantic information such as a specific object, face, and person in an image, and the recognition may be defined as estimating a pose and a pose of a target object in a camera input image. A proposed method of recognizing an object using a descriptor may include: firstly generating a pyramid image and generating a feature point such as a corner; secondly estimating a master direction in a patch region centered on the feature point and rotation-normalizing a hierarchical structured pattern; thirdly describing a descriptor that is represented as a set of codes using the hierarchical structured pattern that is rotation-normalized around the feature point; fourthly performing cascade matching between a binary descriptor extracted from the input image and a pre-stored target object descriptor; and fifthly estimating a geometric transformation relation (homography) between objects based on two-dimensional positions of the matched descriptors.

FIG. 11 shows a process of recognizing an object based on a regional feature point for the above-described process. A left process of a flowchart of FIG. 11 is a process of performing a hierarchical structured binary descriptor operation on an input image, which includes generating an image to generate a scale space when an image is input, extracting feature points such as multiple corners from the scale image, estimating a master direction using a pattern structure proposed by the present invention based on a position of the extracted feature point, and rotation-normalizing the pattern with respect to the master direction. This process may usually include generating, in advance, a lookup table for a pattern rotation of a certain angle to improve a speed, thus reducing an unnecessary operation process (S120, S130, S150, S160 and S170).

The hierarchical-structure-based binary descriptor may be obtained by setting, as representative values, an average of the pixel values that is obtained by normalizing the pattern with respect to the master direction, finding a sum of pixel values of regions centered on respective nodes using an integral image, and then dividing the sum by a size of the region or weights of the pixel values obtained by performing convolution on a Gaussian function having a variance that is set according to a node size of each layer of the pattern, and comparing them in the above-described method.

The descriptor matching may be performed on binary descriptors indicating an input image and binary descriptors indicating a stored database image using the cascade matching method proposed by the present invention (S750a). A pair of inliner descriptors that are accurately matched by applying an RANSAC algorithm to the matched descriptors (S750b), and a pose of the object may be recognized by estimating a homography between positions of feature points of the inliner pair when the number of inliner pairs is at least 4 (S750c).

Figure 12:
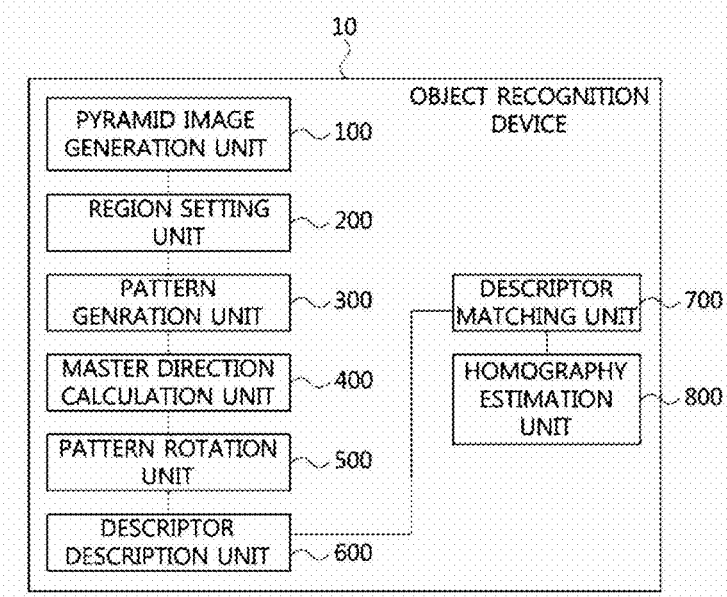
FIG. 12 is a block diagram showing a hierarchical structured pattern based object recognition device and its detailed components according to an embodiment of the present invention.

FIG. 12 is a block diagram showing a hierarchical structured pattern based object recognition device 10 and its detailed components according to an embodiment of the present invention. The hierarchical structured pattern based object recognition device 10 will be described below with reference to FIG. 12.

The hierarchical structured pattern based object recognition device 10, which is a device for recognizing an object from an image using the hierarchical structured pattern based descriptor may include a pattern generation unit 300 configured to generate a hierarchical structured pattern by defining a parent node based on a patch region for a feature point of an input image to be analyzed and defining a child node by dividing the parent node to a predetermined depth, a master direction calculation unit 400 configured to calculate a master direction vector of the patch region based on position coordinates and representative pixel values of the parent node and the child node, and a pattern rotation unit 500 configured to calculate a rotation angle of the patch region based on the master direction vector and rotate the hierarchical structured pattern by the rotation angle.

The hierarchical structured pattern based object recognition device 10 may further include a region setting unit 200 configured to set a patch region for a feature point using at least one of a fast edge detection technique and a Harris corner detection technique.

The hierarchical structured pattern based object recognition device 10 may further include a descriptor description unit 600 configured to describe a descriptor based on a rotated hierarchical structured pattern, the representative pixel value of the parent node, and the representative pixel value of the child node.

The hierarchical structured pattern based object recognition device 10 may further include a pyramid image generation unit 100 configured to generate a pyramid image space including a plurality of images with different sizes by multiplying the image by real numbers and outputting the images in the pyramid image space as the image to be analyzed.

The hierarchical structured pattern based object recognition device 10 may further include a descriptor matching unit 700 configured to separate the descriptor into groups corresponding to a predetermined depth, calculate a distance between the descriptor and a pre-stored reference descriptor for each group, and determine whether the descriptor and the pre-stored reference descriptor are matched based on a result of the calculation. Furthermore, the hierarchical structured pattern based object recognition device 10 may further include a homography estimation unit 800 configured to estimate a homography between an object and a reference object that is a target of the pre-stored reference descriptor.

Moreover, the hierarchical structured pattern based object recognition device 10 may further include an object recognition unit configured to determine whether to recognize an object based on the homography, in which the determining of whether to recognize the object may be at least one of a first determination method of determining whether to recognize the object based on the number of inliers calculated through a random sample consensus (RANSAC) algorithm among descriptors the are finally matched, a second determination method of determining whether to recognize the object based on an accuracy of the homography, and a third determination method of normalizing the object based on the homography such that an affine-transformed region and a reference object region have the same pose and determining whether to recognize the object based on information regarding a template matching result.

Since the description of the hierarchical structured pattern based object recognition device 10 is the same as described above in the method of describing a hierarchical structured pattern based descriptor and the method of estimating a pose of an object in an image, the repetitive description thereof will be omitted.

With the method of describing a hierarchical structured pattern, the method of estimating a pose of an object in an image using the description method, and the device for recognizing an object using the description method, it is possible to generate a descriptor having a recognition performance that is robust to various changes such as blindness, lightening, and rotation of the object. Furthermore, a simple operation enables real-time processing, and an object recognition speed can be significant enhanced compared to the existing methods. This means to overcome the typical limitations of the existing methods in representing an object of the existing methods.

More specifically, the typical limitations of the ORB and BRISK in representing an object due to selection of a feature with learning or at random may be overcome, and the problem of the FREAK that its recognition performance has not been demonstrated clearly may be solved.

Although several aspects of the present invention have been discussed herein with regard to a specific method, it will be obviously understood that the aspects may be utilized in a corresponding device. Here, steps of the method correspond to components of the device. According to certain implementations, example embodiments of the present invention may be implemented in hardware or software. Example embodiments of the present invention may be performed as a computer program product including program codes that execute any one of the above methods.

The above-described subject matter of the present invention is to be considered illustrative and not restrictive, and it should be understood that numerous other modifications and embodiments can be devised by those skilled in the art that will fall within the spirit and scope of the principles of the present invention. Accordingly, the embodiments of the present invention are to be considered descriptive and not restrictive of the present invention, and do not limit the scope of the present invention. The scope of the present invention should be determined by the following claims and their appropriate legal equivalents.

What is claimed is:

1. A method of generating a hierarchical structured pattern based descriptor to recognize an object from an image, the method comprising:

generating a hierarchical structured pattern by defining a parent node based on a patch region for a feature point of an input image to be analyzed and defining a child node by dividing the parent node to a predetermined depth;

calculating a master direction vector of the patch region based on representative pixel values and position coordinates of the parent node and the child node; and calculating a rotation angle of the patch region based on the master direction vector and rotating the hierarchical structured pattern by the rotation angle;

after the rotating of the hierarchical structured pattern by the rotation angle, describing a descriptor based on the rotated hierarchical structured pattern, the representative pixel value of the parent node, and the representative pixel value of the child node.

2. The method of claim 1, further comprising, before the generating of the hierarchical structured pattern, setting the patch region for the feature point using at least one of a FAST edge extraction technique and a Harris corner detection technique.

3. The method of claim 1, wherein the hierarchical structured pattern is generated in a recursive method in which a first child node is defined by dividing a top parent node by the predetermined number N of nodes and a child node is defined for each depth using the first child node as a second top parent node, N being a natural number and the division having a redundancy or exception.

4. The method of claim 3, wherein the recursive method includes, a first division method of equally dividing the top patent node using a radius of the top parent node as a diameter to generate N first child nodes, a second division method of additionally generating one first child node forming a circle concentric with the top parent node after performing the first division method a number of times equal to the predetermined number N of nodes minus 1, or a third division method of equally dividing the top patent node using a length greater than the radius of the top parent node as the diameter to generate the N first child nodes.

5. The method of claim 3, wherein the predetermined number of nodes and the predetermined depth are increased or decreased based on the feature point.

6. The method of claim 1, wherein the representative pixel value is an average of pixel values of regions corresponding to the parent node or the child node or a pixel value weighted by performing Gaussian convolution on the region.

7. The method of claim 1, further comprising, before the generating of the hierarchical structured pattern, multiplying the image by real numbers to generate a pyramid image space including a plurality of images with different sizes and outputting one of the images within the pyramid image space as the image to be analyzed.

8. A method for recognizing an object in an image using a hierarchical structured pattern based descriptor, the method comprising:

separating a descriptor into groups having a predetermined number D;

calculating a distance between an i-th group of the descriptor and a pre-stored i-th group of a reference descriptor;

calculating a distance between an (i+1)th group of the descriptor and a pre-stored (i+1)th group of the reference descriptor when the calculated distance is determined to be less than a certain threshold value; and matching the descriptor with the pre-stored reference descriptor when a distance between a D-th group of the descriptor and a pre-stored D-th group of the reference descriptor is determined to be less than a certain threshold value, wherein i is iterated from a first term 1 to D−1.

9. The method of claim 8, further comprising, when the distance between the i-th group of the descriptor and the pre-stored i-th group of the reference descriptor is greater than or equal to the certain threshold value, omitting the calculating of the distance between the (i+1)th groups, and skipping the matching between the descriptor and the pre-stored reference descriptor.

10. The method of claim 8, further comprising, after the matching of the descriptors, estimating a homography between the object and a reference object that is a target of the pre-stored reference descriptor.

11. The method of claim 10, further comprising, before the estimating of the homography, determining whether to recognize the object based on the homography, wherein the determining of whether to recognize the object includes at least one of a first determination method of determining whether to recognize the object based on the number of inliers calculated through a random sample consensus (RANSAC) algorithm among descriptors that are finally matched, a second determination method of determining whether to recognize the object based on accuracy of the homography, and a third determination method of normalizing the object based on the homography such that an affine-transformed region and a reference object region have the same pose and determining whether to recognize the object based on information regarding a template matching result.

12. The method of claim 8, wherein the predetermined number (D) is equal to a depth to which the patch region for the feature point that is the target of the hierarchical structured patter based descriptor is divided into child nodes.

13. A device for recognizing an object from an image using a hierarchical structured pattern based descriptor, the device comprising:

a pattern generation unit configured to generate a hierarchical structured pattern by defining a parent node based on a patch region for a feature point of an input image to be analyzed and defining a child node by dividing the parent node to a predetermined depth;

a master direction calculation unit configured to calculate a master direction vector of the patch region based on position coordinates and representative pixel values of the parent node and the child node;

a pattern rotation unit configured to calculate a rotation angle of the patch region based on the master direction vector and rotate the hierarchical structured pattern by the rotation angle; and a descriptor description unit configured to describe a descriptor based on the rotated hierarchical structured pattern, the representative pixel value of the parent node, and the representative pixel value of the child node.

14. The device of claim 13, further comprising a region setting unit configured to set the patch region for the feature point using a FAST edge extraction technique and a Harris corner detection technique.

15. The device of claim 13, further comprising a pyramid image generation unit configured to multiply the image by real numbers to generate a pyramid image space including a plurality of images with different sizes and output one of the images within the pyramid image space as the image to be analyzed.

16. The device of claim 13, further comprising a descriptor matching unit configured to separate a descriptor into a number of groups corresponding to a predetermined depth, calculate a distance between the descriptor and a pre-stored reference descriptor for each group, and determine whether the descriptor and the pre-stored reference descriptor are matched based on a result of the calculation.

17. The device of claim 16, further comprising a homography estimation unit configured to estimate a homography between the object and a reference object that is a target of the pre-stored reference descriptor.

18. The device of claim 17, further comprising an object recognition unit configured to determine whether to recognize the object based on the homography, wherein the object recognition unit includes at least one of a first determination by determining whether to recognize the object based on the number of inliers calculated through a random sample consensus (RANSAC) algorithm among descriptors the are finally matched, a second determination by determining whether to recognize the object based on accuracy of the homography, and a third determination by normalizing the object based on the homography such that an affine-transformed region and a reference object region have the same pose and determining whether to recognize the object based on information regarding a template matching result.

\* \* \* \* \*